United States Patent
Marosy

[15] 3,695,648
[45] Oct. 3, 1972

[54] COUPLING
[72] Inventor: Andre Marosy, 24731 Kipling, Oak Park, Mich. 48237
[22] Filed: Aug. 6, 1970
[21] Appl. No.: 61,546

[52] U.S. Cl. ..................285/376, 285/162, 285/338, 285/358
[51] Int. Cl. .............................................F16l 37/00
[58] Field of Search .......................285/338, 358, 360, 401, 375–377, 285/158, 162

[56] References Cited

UNITED STATES PATENTS

| | | | |
|---|---|---|---|
| 3,048,428 | 8/1962 | Ransom | 285/338 X |
| 850,410 | 4/1907 | Weatherhead | 285/338 X |
| 3,538,950 | 11/1970 | Porteners | 285/376 X |

Primary Examiner—J. Karl Bell
Attorney—Hauke, Gifford and Patalidis

[57] ABSTRACT

A quickly attachable and detachable coupling for connecting a hose or the like to a fitting in a fluid tight relationship. The coupling includes a male member attached to the hose and having a pair of spaced ears and the fitting is provided with a female portion having slots to receive the ears and to produce a locking connection between the fitting and the male member upon relative rotation of the members through an approximately one quarter turn. During the turn the ears engage a cam surface to move an inner sleeve of the fitting into compressing engagement with a seal to provide a sealing fit between the sleeve and the fitting. The sleeve is also provided with a conical seat which receives an O-ring carried by the male member to provide a fluid tight connection between the male member and the fitting.

7 Claims, 7 Drawing Figures

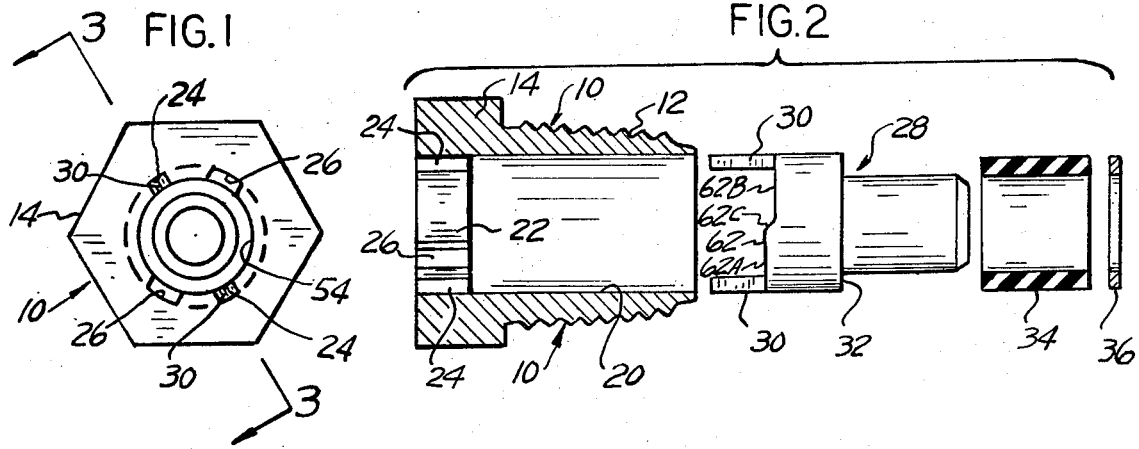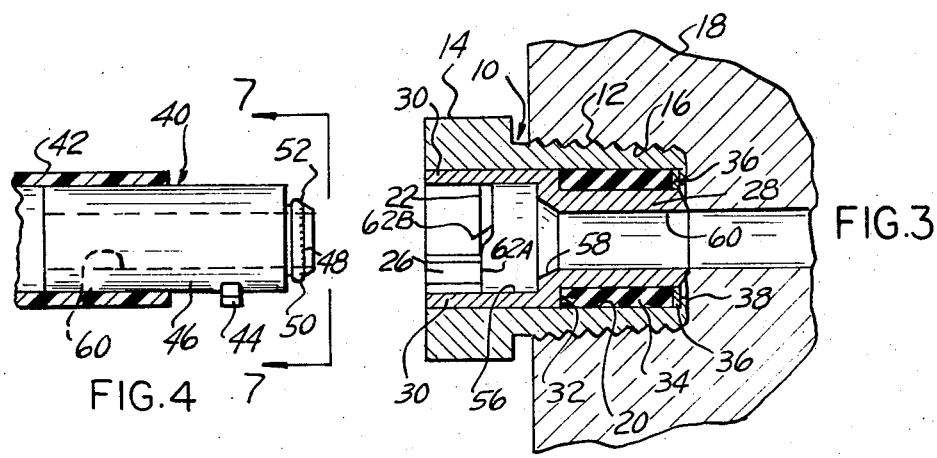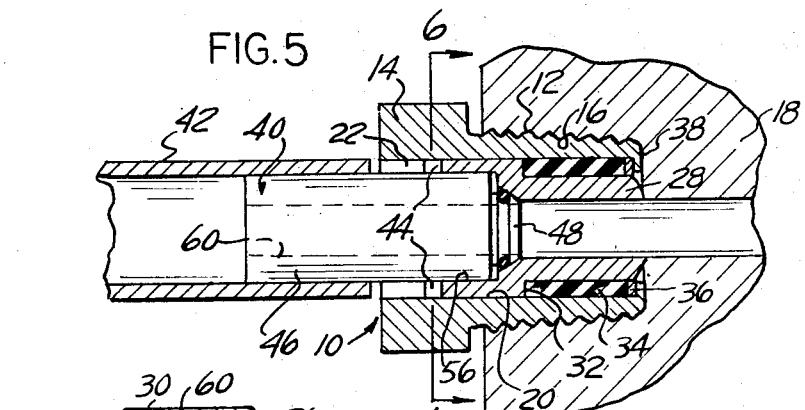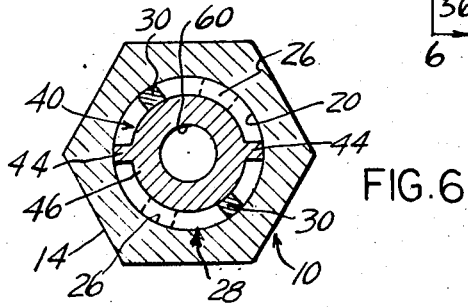

COUPLING

BACKGROUND OF THE INVENTION

I. Field Of The Invention

The present invention relates to hose couplings and more particularly to a means for quickly attaching and detaching a hose or the like to and from a fitting.

II. Description Of The Prior Art

Heretofore connections between tubular fluid conducting members or between such members and other elements of a fluid system have been provided by either providing a ferrule on the end of the tubular member or by flaring the tubular member to thereby retain a fitting which is threaded onto other fittings to make up the connection. Such fittings often leak and are difficult to connect and disconnect when this is necessary.

SUMMARY OF THE PRESENT INVENTION

The present invention provides a coupling for tubular members such as those used in a fluid system for connecting the end of the tubular member to a fitting for either joining two tubular members together or for joining the tubular member to some other element in a fluid system. A connection between the tubular member and the fitting is made by inserting a male member secured to the end of a tubular hose or conduit into a female portion of the fitting. A relative quarter turn of the members produces a locking connection therebetween and exerts an axial force which compresses a seal to provide a fluid tight connection therebetween. Disconnection can be easily accomplished by a quarter turn in the opposite direction followed by axial separation of the members.

DESCRIPTION OF THE DRAWINGS

A clear understanding of the present invention will be achieved upon reference to the following drawings in which like reference characters refer to like parts throughout the several views and in which:

FIG. 1 is an elevational end view of a fitting embodying the present invention;

FIG. 2 is an exploded perspective view of the fitting shown in FIG. 1 with portions shown in cross section for purposes of clarity;

FIG. 3 is a longitudinal cross-sectional view taken substantially on line 3—3 of FIG. 1 and illustrating the fitting mounted in place;

FIG. 4 is an elevational side view of the male member of the coupling of the present invention;

FIG. 5 is a cross-sectional view illustrating the members connected together;

FIG. 6 is a transverse cross-sectional view taken substantially on line 6—6 of FIG. 5; and FIG. 7 is an end elevational view of the male member taken substantially on line 7—7 of FIG. 4.

DESCRIPTION OF A PREFERRED EMBODIMENT

Now referring to the drawings for a more detailed description of the present invention, FIGS. 1, 2 and 3 illustrate a fitting 10 similar in configuration to a conventional male fitting in that it has an externally threaded portion 12 at one end and a nut portion 14 at the other end. Thus as shown in FIG. 3, the fitting 10 is adapted to be received by an internally threaded bore 16 to make a connection between the fitting 10 and some element 18 of a fluid system. It is clear that instead of being mounted to the element 18 the fitting 10 could receive a female fitting in a conventional manner and it will become apparent as the description proceeds that although it has been preferred to embody the present invention in the male fitting 10 it could be embodied in other fittings as well.

As can best be seen in FIG. 2 the fitting 10 further includes a substantially cylindrical inner wall 20 extending from the threaded end of the fitting to an internal flange portion 22 formed adjacent the opposite end thereof. Axially extending oppositely disposed slots 24 and similar slots 26 extend through the flange portion 22 as can best be seen in FIG. 1 with the width of the slots 24 preferably being narrower than the width of the slots 26. Although the slots 24 are positioned approximately 180° from each other as are the slots 26 they are positioned with respect to each other such that the slots 26 are positioned quite close to the slots 24 in a counterclockwise direction but are spaced from the next slot 24 in a clockwise direction approximately 120°.

An inner sleeve member 28 is adapted to be received within the bore 20 of the fitting 10 and is provided with a pair of axially extending extensions 30 disposed and dimensioned to be axially received by the slots 24 to thereby prevent relative rotation between the inner sleeve member 28 and the fitting 10. The narrower width of the slots 24 insures that the extensions will not accidentally be inserted in the slots 26. The sleeve member 28 is provided with a reduced section near the inner end which forms an annular shoulder 32. A seal 34 of compressible material such as rubber or the like is carried by the reduced section of the sleeve member 28 intermediate the shoulder 32 and an annular washer 36. After the inner sleeve member 28 has been inserted into the fitting 10 with the washer 36 and the seal 34 in place the inner edge of the fitting 10 adjacent the washer 36 is preferably rolled inwardly as shown at 38 to lock the washer 36, the seal 34 and the sleeve member 28 in place. It is apparent that other means could be utilized to produce this locking engagement.

As the invention has been thus far described the inner sleeve member 28 is prevented from moving axially to the left (FIG. 3) with respect to the fitting 10 by the engagement between the end of the sleeve member 28 and the inner edge of the flange portion 22 of the fitting 10. Rotation between the sleeve member 28 and the fitting 10 is prevented by the extensions 30 disposed in the slots 24. The sleeve member 28 can, however, move to the right to the extent permitted by the compressible seal 34. Movement to the right, however, compresses the seal 34 and therefore produces a fluid tight seal between the wall portion 20 and the outer surface of the sleeve member 28.

As can best be seen in FIG. 4, a male member 40 of the present invention is adapted for connection in any conventional manner to the end of a fluid conduit 42 which may be a plastic hose or a copper conduit as conventionally used in fluid systems. The male member 40 includes a pair of ears 44 disposed on opposite sides of a substantially cylindrical wall section 46 and spaced from the end of the male member 40. The cylindrical wall section 46 terminates in a frusto-conical end section 48 formed with an annular seat 50 spaced from the end thereof to carry an O-ring seal 52.

The flange portion 22 of the fitting 10 forms a circular opening 54 in the end of the fitting 10 and the sleeve member 28 is formed with an inner wall portion 56 of substantially the same diameter as the opening 54. A frusto-conical seat 58 formed in the sleeve member 28 registers with the chamber formed by the wall 56 and a fluid passage 60 formed through the interior of the sleeve member 28. As can best be seen in FIGS. 2–3 the outer edge of the sleeve member 28 adjacent to the flange portion 22 of the fitting 10 is provided with a pair of cam surfaces 62. The cam surfaces 62 are disposed opposite each other and extend in a clockwise direction from each of the slots 26 to the next adjacent slot 24 so that they extend approximately 90° The surfaces 62 are preferably formed to provide a section 62A proximate the slots 26 which is disposed closely adjacent the inner edge of the flange portion 22 and a section 62B extending somewhat inwardly of the section 62A and separated by a rather sharp, inwardly extending section 62C. The edge 62C acts to aid in retaining the ears 44 in position once they have been rotated into the sections 62B.

The ears 44 are adapted to be received axially by the slots 26 and are spaced from the end of the male member 40 such that when the male member 40 is inserted through the opening 54 with the ears 44 in the slots 26 the ears 44 will engage the cam surface 62 of the inner sleeve member 28. Rotation of the male member 40 approximately a quarter of a turn will cause the ears 44 to engage the cam surface 62 and urge the inner sleeve member 28 inwardly or to the right in the drawings within the fitting 10. As indicated heretofore movement to the right of the inner sleeve member 28 compresses the seal 34 and provides a sealing fit between the inner sleeve member 28 and the fitting 10. The axial dimension of the ears 44 will at least in part determine the extent of this movement so this provides a convenient way of providing the proper seal.

The frusto-conical end 48 of the male member 40 is dimensioned to be received by the frusto-conical seat 58 to compress the O-ring seal 52 against the seat 58 to produce a fluid tight seal between the inner sleeve member 28 and the male member 40.

It is apparent then that a coupling has been described which can be used to quickly attach tubular members either together or to other elements of a fluid system. Although the coupling is convenient to use, it still produces a fluid tight fitting.

While it has been preferred to show the male member 40 as attached to the conduit 42 and the female portion of the coupling embodied in the fitting 10 it is apparent that a number of modifications to this arrangement can be provided without departing from the present invention. For instance the male portion of the coupling could be a part of a fluid element within the fluid system or it could be embodied in a fitting like the fitting 10 and a member having the female portion could be attached to a fluid conduit. Also as indicated above the female portion could be embodied in fittings of types other than the male fitting shown.

Although I have described but one embodiment of my invention it is also apparent that other changes and modifications can be made without departing from the spirit of the present invention as expressed by the scope of the appended claims.

I claim:

1. Means for producing a fluid tight coupling comprising:
   a female portion including a first member and an axially slidable member received within said first member, a male member received by said female portion,
   a seal carried within said female portion intermediate said first member and said axially slidable member to be compressed upon relative axial movement between said axially slidable member and said first member in one direction to prevent fluid leakage between said axial slidable member and said first member;
   means operable upon said male member being inserted into said female portion to move said axially slidable member in said seal compressing direction; and
   a second seal, said second seal being carried by said male member and means formed by said axially slidable member to engage said second seal upon insertion of said male member into said female portion to provide a fluid tight connection between said axially slidable member and said male member.

2. Means for producing a fluid tight coupling comprising:
   a female portion including a first member and an axially slidable member received within said first member, a male member received by said female portion,
   a seal carried within said female portion intermediate said first member and said axially slidable member to be compressed upon relative axial movement between said axially slidable member and said first member in one direction to prevent fluid leakage between said axial slidable member and said first member;
   means operable upon said male member being inserted into said female portion to move said axially slidable member in said seal compressing direction; and
   means operable upon relative rotation between said fitting and said male member after insertion of said male member into said female portion to lock said female portion and said male member together;
   said locking means comprising a laterally outwardly extending ear portion formed on said male member, said female portion being provided with a slot for receiving said ear portion, said ear portion engaging said axially slidable member to produce axial movement thereof upon insertion of said male member into said female portion;
   and an arcuately extending cam slot formed in said female portion for receiving said ear portion upon insertion of said male member into said female portion and relative rotation therebetween in one direction.

3. Means for producing a fluid tight coupling comprising:
   a female portion including a first member and an axially slidable member received within said first member, a male member received by said female portion,
   a seal carried within said female portion intermediate said first member and said axially slidable member to be compressed upon relative axial movement between said axially slidable member and said first member in one direction to prevent fluid leakage between said axial slidable member and said first member;

means operable upon said male member being inserted into said female portion to move said axially slidable member in said seal compressing direction; and means for preventing relative rotation between said axially slidable member and said first member.

4. The means as defined in claim 3 in which said last mentioned means comprises an axially extending slot formed in the inner wall of said female, and an axially extending portion of said slidable member extending into said slot.

5. Means for producing a fluid tight coupling comprising:

a female portion including a first member and an axially slidable member received within said first member, a male member received by said female portion, a seal carried within said female portion intermediate said first member and said axially slidable member to be compressed upon relative axial movement between said axially slidable member and said first member in one direction to prevent fluid leakage between said axial slidable member and said first member;

means operable upon said male member being inserted into said female portion to move said axially slidable member in said seal compressing direction, and operable upon relative rotation between said fitting and said male member after insertion of said male member into said female portion to further urge said axially slidable member in said seal compressing direction and to mechanically lock said female portion and said male member together.

6. The means as defined in claim 5 and in which said last mentioned means comprises a laterally outwardly extending ear portion formed on said male member, said female portion being provided with a slot for receiving said ear portion, said ear portion engaging said inner axially slidable member to produce axial movement thereof upon insertion of said male member into said female portion.

7. The means as defined in claim 5 and in which said axially slidable member includes an annular, reduced diameter section forming an annular shoulder adjacent one end thereof, said fitting including means axially spaced from said annular shoulder, and said seal being carried therebetween.

* * * * *